March 2, 1954 M. E. PARSONS 2,670,653
LOOP REPLENISHER FOR MOTION-PICTURE MACHINES
Filed June 9, 1951 2 Sheets-Sheet 1

INVENTOR.
MURRAY E. PARSONS,
BY
Barkelew & Scantlebury
ATTORNEYS.

March 2, 1954     M. E. PARSONS     2,670,653
LOOP REPLENISHER FOR MOTION-PICTURE MACHINES
Filed June 9, 1951     2 Sheets-Sheet 2

INVENTOR.
MURRAY E. PARSONS,
BY
Barkelew & Scantlebury
ATTORNEYS.

Patented Mar. 2, 1954

2,670,653

UNITED STATES PATENT OFFICE 2,670,653

LOOP REPLENISHER FOR MOTION-PICTURE MACHINES

Murray E. Parsons, Sun Valley, Calif., assignor to Mitchell Camera Corporation, Glendale, Calif., a corporation of Delaware Application June 9, 1951, Serial No. 230,796

7 Claims. (Cl. 88—18.4)

This invention relates generally to movement mechanisms such as are utilized typically in motion picture apparatus for intermittently advancing a motion picture film to bring successive film frames to an exposure aperture. More particularly, the invention has to do with supplementary means for advancing the film when the intermittent mechanism fails, for example due to a local defect in the film. Under such conditions the supplementary film advancing means comes into operation, moving the film perhaps only one or two frames before the defective portion of the film is passed and the intermittent mechanism resumes its normal function.

In kinetograph machines of usual construction the intermittent mechanism proper ordinarily delivers film intermittently to a free film loop, and a continuously rotating takeup sprocket receives film from that loop. Therefore, if for any reason the intermittent delivery of film to the loop is interrupted while the sprocket continues to take up film from the loop, the loop tends to decrease in size until the film becomes taut. Such loss of the film loop ordinarily prevents proper operation of the machine and may tear the film. Supplementary film advancing devices of the type indicated maintain film delivery to the film loop irrespective of proper functioning of the intermittent movement, and thereby maintain or restore correct loop size. For that reason such devices are frequently referred to as "loop replenishers."

Many mechanisms have been proposed for accomplishing the described function. For the most part such previous devices require several moving parts that must be coordinated in movement accurately with other parts of the mechanism. Moreover, since the supplementary film moving device may remain idle during long periods of machine operation, defects may occur in its adjustment, lubrication and the like, without coming to attention until the device fails to operate when most needed. It is therefore of great importance that any such emergency means be of simplest possible mechanical form and require a minimum of maintenance.

The present invention provides supplementary film actuation of a type that fully satisfies those conditions and is entirely reliable in operation. In preferred form, the invention requires addition of only one part to previous kinetograph machines, and that one part is not necessarily a moving part.

In accordance with the present invention, a convex wall is provided along a portion of the inner face of the film loop immediately adjacent the position assumed by that film face when the loop has its minimum normal size. Such a wall may, for example, be a cylindrical surface of a roller journaled within the film loop on a fixed axis. The roller axis is then located in such a manner that the film is drawn nearly, but not quite, taut to the roller surface by the takeup sprocket at the start of each normal pull down stroke of the intermittent mechanism. If that mechanism functions normally, the film is advanced, enlarging the film loop, and the film either does not touch the roller at all or touches it only very lightly. On the other hand, if, for example, a film perforation is torn and the intermittent mechanism fails to advance the film along guide during a particular cycle, the continuous rotation of the takeup sprocket first draws the film loop taut over the roller and then, since the film loop is prevented by the roller from becoming smaller, draws film through the film guide at a speed equal to the normal average speed of film advance. The film is thereby advanced substantially a full film frame before the start of the next following pull down stroke of the intermittent mechanism, bringing another film perforation into position for engagement by the intermittent mechanism. If that perforation is undamaged, normal engagement can take place, and the film is again advanced intermittently in the usual manner.

A full understanding of the invention and of its further objects and advantages will be had from the following description of certain illustrative embodiments. Neither the accompanying drawings, which form a part of that description, nor the mechanical details of the selected embodiments are intended to limit the scope of the invention, which is defined in the appended claims.

Figures 1, 2:
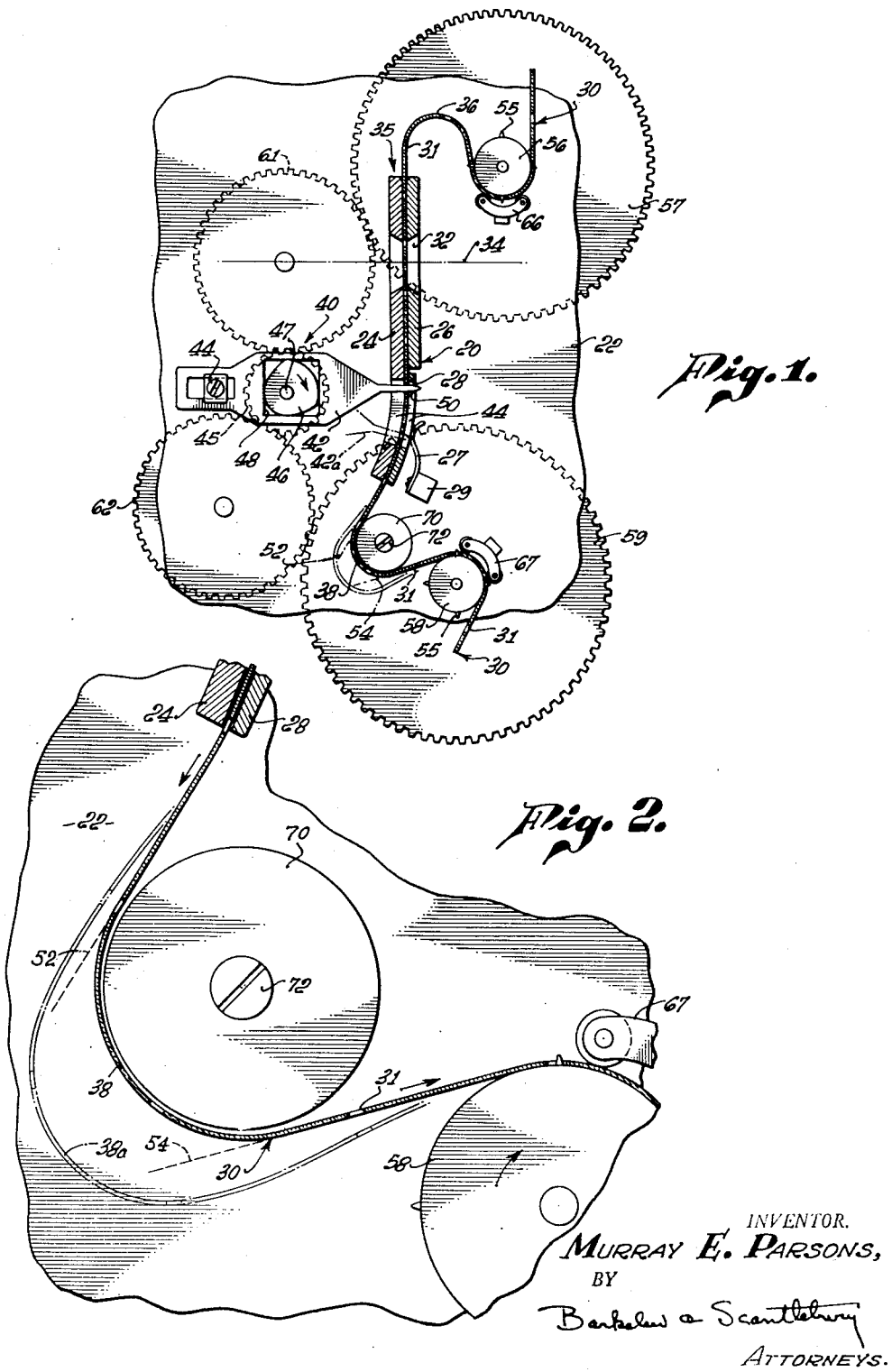
Fig. 1 is a side elevation of an illustrative embodiment of the invention, shown partly schematically at the start of a normal film advancing stroke.
Fig. 2 represents a portion of Fig. 1 at enlarged scale, the position at the finish of a stroke being shown in dashed lines.
Figure 3:
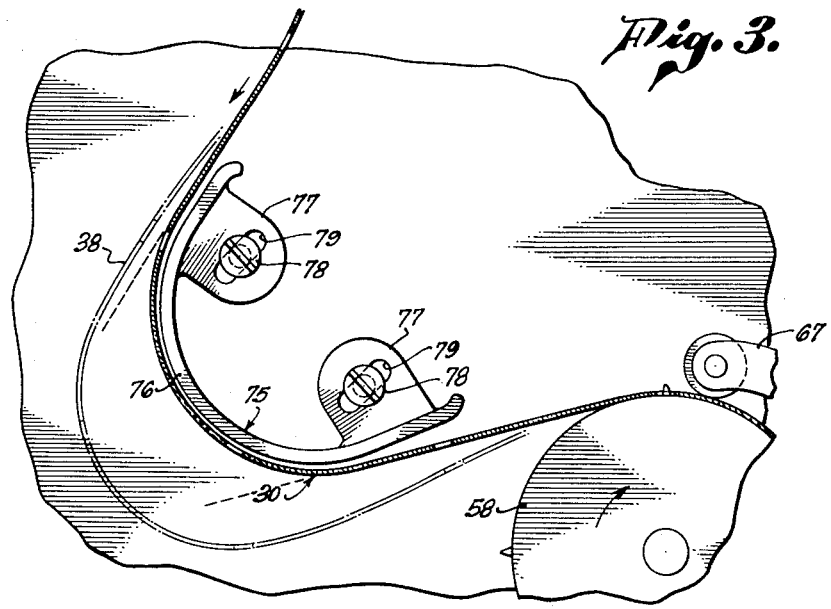
Figure 4:
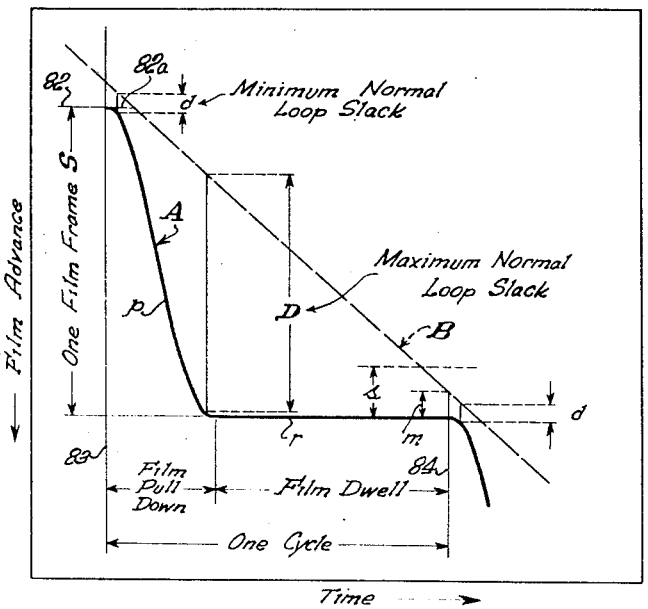

Fig. 3 corresponds to Fig. 2, but illustrates a modified form of the invention; and Fig. 4 is a diagram illustrating the invention.

Referring first more particularly to Fig. 1, a typical film gate or guide is indicated at 20 mounted on a frame plate 22, which may be considered as part of the rigid frame of a motion picture machine. Film guide 20 comprises typically two plates 24 and 26, which may be relatively movable for convenience of film threading, and which define a film channel 35 through which a film 30 may be drawn. Plates 24 and 26 may be provided with a film aperture, as indicated at 32, at which film frames are successively centered on optical axis 34. The lower portion of plate 26 may be cut away, as indicated, to make room for a presser plate 28, which is spring pressed toward guide plate 24 as by a spring 27 mounted at 29 on frame plate 22. The film is thus yieldingly confined to channel 35 in the neighborhood of intermittent claw 50, to be described.

The numeral 40 represents an illustrative intermittent movement for intermittently advancing film 30 along film guide 20 in a forward direction, taken as downward in the present illustrative embodiment. Intermittent 40, which may assume a wide variety of specific forms, is shown for purposes of illustration as a claw movement comprising a claw arm 42 slidingly pivoted at 44 on frame plate 22 and driven by a single cam 46 of constant width type. Cam 46 is mounted fixedly on cam shaft 47, journaled in frame plate 22, and is enclosed as in a box by two sets of opposed follower surfaces mounted on claw arm 42, those follower surfaces being illustratively formed as the four faces of a square aperture 48 in the claw arm. Cam shaft 47 is driven at uniform speed in a clockwise direction, as seen in Fig. 1, for example, by any suitable means, which may include an electric motor, not shown, acting through the gear 45, fixedly mounted on the shaft on the farther side of mounting plate 22. A single film engaging claw is represented illustratively at 50, mounted at the forward end of claw arm 42. Slots 44 are indicated in film guide plate 24 and in presser plate 28 in position to provide access for the claw to the film.

As illustrated, the lower portion of film guide 20 is curved to conform to the path of movement of claw 50 in its downward film advancing stroke. The action of intermittent movements of the type illustrated is well understood and need not be described in detail. As shown in Figs. 1 and 2, the claw has been advanced into engagement with a film perforation 31, and the film advancing stroke of the claw is about to start, in response to clockwise rotation of cam 46. The intermittent mechanism is so proportioned that each downward stroke of cam 46 advances the film one film frame, shown illustratively in the drawings as equal to the longitudinal spacing between successive film perforations 31.

Film is drawn from a supply reel, not shown, by a feed sprocket 56 and supplied via an upper film loop 36 to film guide 20 and intermittent mechanism 40. The film leaves film guide 20 at its delivery end (its lower end in the present embodiment) in a well-defined delivery direction, represented by the line 52 in Fig. 1. A takeup sprocket 58 receives film from film guide 20, the direction of movement of the film as it reaches sprocket 58 being indicated approximately in Fig. 1 by the line 54. Since the takeup direction 54 is different from delivery direction 52, a lower film loop 38 is formed between film guide 20 and takeup sprocket 58. Feed sprocket 56 and takeup sprocket 58, as shown, are mounted on respective sprocket shafts journaled in frame plate 22, and are provided with the usual sprocket clamps, indicated schematically at 66 and 67, respectively.

The sprockets are driven continuously in definite speed relation to each other and to intermittent 40 such that the average rate of film advance by the intermittent mechanism is equal to the uniform rate of film feed by each sprocket. As shown typically, film 30 has one film perforation per film frame, so that the four-tooth sprockets feed four film frames per revolution, while the intermittent mechanism advances the film one film frame for each revolution of cam shaft 47. Accordingly, the sprocket shafts are driven at one quarter the speed of cam shaft 47. Means for producing that speed relation are indicated illustratively as comprising sprocket gears 57 and 59 of suitable size mounted fixedly on the respective shafts of sprockets 56 and 58 and driven from cam shaft gear 45 through the respective idler gears 61 and 62.

In accordance with the present invention, a roller 70 is rotatably mounted, as on a stud 72 fixed in frame plate 22, within lower film loop 38 in position to be immediately adjacent the inner face of the film loop when the latter has its minimum normal size. That condition occurs at the start of each normal pull down stroke of the intermittent mechanism. As illustrated diagrammatically in Fig. 4, the film advance normally produced by the intermittent mechanism follows a step-wise course, represented by the solid line A, each cycle of film movement including a period of relatively rapid film pull down $p$ and a period of film dwell $r$. On the other hand, the continuous rotation of sprocket 58 takes up film at a uniform rate, as represented by the broken line B in Fig. 4. The slope of line B is equal to the average slope of line A, corresponding to the fact that during each complete cycle of the intermittent mechanism the sprocket takes up one film frame. Thus the length of film in lower loop 38, or the size of the loop, varies periodically between a definite minimum value at the start of each film advancing stroke of the intermittent and a definite maximum value at the finish of each stroke. The position of the loop, and more particularly the position of the inner face of the loop, varies correspondingly between a contracted position at the start of each stroke and an expanded position at the finish of each stroke.

The absolute size of the film loop at any point in the cycle, for example the minimum absolute size, depends upon the relative phase of the rotation of sprocket 58 and of cam 46, which is positively determined by the driving connection between them (gears 45, 62 and 59 in the present embodiment). That loop size also depends, of course, upon such structural characteristics of the mechanism as the relative positions of the sprocket and film guide, the form of the film guide, and the position longitudinally of the film guide at which claw 50 engages and advances the film. The loop size also depends upon the length of film (for example, the number of free perforations) that is left between claw 50 and sprocket 58 in threading the machine. In any given mechanism all such factors may be considered in practice to be definitely established, so that the minimum normal size of lower film loop 38 correspondingly has a definite value. The contracted position of the inner face of the film loop is correspondingly definitely established.

The position within the loop in which roller 70 is mounted is immediately adjacent that contracted position of the film loop. The cylindrical roller surface is preferably substantially tangent to the delivery direction 52 of film guide 20 and to takeup direction 54 of sprocket 58. The radius of roller 70 is made such that the roller surface fits, as closely as possible, the inner face of film loop 38 when the latter is in contracted position. As is clearly illustrated, for example, in the preferred embodiment of Fig. 2, that fit extends over a substantial fraction of the curved portion of the film loop, and the radius of roller 70 is substantially equal to the radius of curvature assumed by the central curved portion of the loop when the latter hangs freely in contracted position as shown at 38. The roller is located sufficiently close to the contracted position of the film loop that the slack remaining in the loop, when fully contracted under normal operation of the mechanism, is less (measured longitudinally of the film) than the longitudinal dimension of a film perforation. It has been found that with standard types of motion picture film it is possible to satisfy that latter condition without causing appreciable film contact with the roller under normal operating conditions.

In Fig. 4 the relative positions of curves A and B have been so adjusted that the vertical spacing between them at any selected point of the pull down cycle represents qualitatively the slack in the film loop at that point of the cycle, that is to say, the length of film that would have to be drawn over sprocket 58 to draw the film loop taut over roller 70. That loop slack varies from a minimum value, represented in Fig. 4 by the distance $d$, at the start of the pull down stroke, to a maximum value, represented by the distance D. It will be noted that the minimum loop size occurs a very short time after the actual start of the pull down movement, when the increasing speed of film movement through the film guide (represented by the changing slope of curve A) becomes equal to the constant speed of film feed over sprocket 58 (represented by the slope of curve B). Similarly, the maximum loop slack D occurs just before the actual completion of film pull down, when the decreasing speed of film delivery from the film guide again becomes equal to the constant rate of takeup by the sprocket. Since the film is in practice accelerated relatively rapidly at the start of the stroke and slowed down relatively rapidly at the finish of the stroke, the minimum and maximum film loops very nearly coincide with the actual start and finish, respectively, of the pull down stroke. Whatever slight difference exists in practice is to be kept in mind, but will not be repeatedly mentioned, in connection with the present description and claims.

In Fig. 4 the film length of one film frame is the vertical distance between successive dwell periods of curve A, indicated in the diagram as S. The dimension of a typical film perforation, measured longitudinally of the film, is typically indicated for reference in Fig. 4 as the distance $s$, that distance being one sixth of S for standard 16 mm. film. It will be seen from the diagram that $d$, the normal minimum loop slack over the roller is less than perforation width $s$. In preferred form of the invention $d$ is from one quarter to one half of $s$, depending upon details of the mechanical structure of the mechanism. Fig. 2 represents qualitatively in considerable detail the preferred relation between roller 58 and the lower film loop. The film loop is shown in solid lines at 38 in its contracted position, the longitudinal slack in the loop then corresponding to $d$ of Fig. 4. Immediately following that condition, under normal operation, the intermittent mechanism, typically claw 50, advances the film along film guide 20 in a pull down stroke, building up the film loop faster than it is taken up by sprocket 58. The loop therefore becomes no smaller than is represented at 38 in Fig. 2, but expands to the position shown in dashed lines at 38a, which corresponds qualitatively to the maximum loop slack D of Fig. 4.

If claw 50 fails to engage a film perforation (because of a film defect, for example), the forward claw stroke fails to advance the film. The film dwell, $r$, represented typically in Fig. 4 at 82 therefore continues after the time indicated by line 83 at which the pull down stroke of the claw starts. That continuation of film dwell 82 is represented by the extension 82a of line 82. The film slack, which is taken up steadily by sprocket 58 during normal film dwell 82, continues to decrease during that abnormal extension 82a of the film dwell. At a time corresponding to the intersection of line 82a with line B, the slack of the film loop is all removed, and the film loop becomes taut over roller 70. Sprocket 58 then draws film through film guide 20 and over roller 70, so that the film position as represented in Fig. 4 moves along the line B. That action continues throughout the remainder of the pull down stroke of the claw and the following dwell period. At the end of that dwell period, represented in Fig. 4 by the time line 84, the film has been advanced along guide 20 very nearly a full film frame S, bringing another film perforation very nearly into position for engagement by the claw during the next claw cycle. The deficiency of that advance is represented diagrammatically at $m$, which is substantially the same as the minimum normal loop slack $d$. The distance $m$ represents the degrees of misalignment of the next film perforation with the claw. So long as that misalignment $m$ is appreciably less than the width $s$ of a film perforation, a claw of suitable diameter and taper can still enter the perforation, the claw taper serving to cam the film along the film guide sufficiently to admit the body of the claw. With claw engagement of the film thus reestablished, the following claw stroke functions to advance the film, in a normal manner, and the film movement is once more represented by the line A in Fig. 4. If several successive film perforations are damaged in a manner to prevent claw engagement, the film movement continues as represented by the curve B until a sound perforation is reached, when normal operation is resumed as described.

In certain types of claw movement the claw may be projected into full film engagement an appreciable time before the start of the actual pull down stroke. It is then desirable to provide a yielding presser plate, such as is shown illustratively at 28 in Fig. 1. The yielding action of the presser plate then permits transverse film movement out of the path of the claw. It is then immaterial whether the supplementary film movement along line B of Fig. 4 brings a sound perforation opposite the claw before the latter contacts the film. If the claw contacts the film (following an ineffective stroke) before the supplementary film movement along line B of Fig. 4 has brought the next perforation opposite the claw, the claw merely displaces the film and plate 28 transversely. Longitudinal film movement continues, sliding the film past the end of the claw until the leading edge of the perforation passes the point of the claw. Spring 27 of the presser plate mounting then presses the film back into its normal transverse position, producing full claw engagement in the perforation. If the claw end is tapered, as is preferred, that taper may cam the film longitudinally forward along the film guide under such action of the presser plate. For that purpose, presser plate spring 27 should be sufficiently stiff to overcome the frictional resistance of the film to longitudinal movement, yet sufficiently soft to yield to claw projection without damaging the film. In practice the degree of spring tension normally used in film pressure pads is found to fulfill those conditions satisfactorily.

Fig. 3 corresponds to Fig. 2, but shows an alternative modification of the invention in which the loop limiting wall is fixed as to longitudinal as well as transverse movement. As typically shown, wall 75 has a convexly curved surface 76 and is fixedly mounted on frame plate 22 as by brackets 77 and screws 78. In preferred form, adjustment of the transverse position of wall 75 is provided, such adjustment being indicated illustratively by the slotted holes 79 in brackets 77 that receive screws 78. In the modification of Figs. 1 and 2, the position of roller stud 72 may be made similarly adjustable on frame plate 22. By loosening screws 78, the convex wall face 76 may be brought into closely spaced relation with the inner face of a properly threaded film loop 38 when the latter is in contracted position. For example, the wall may be first advanced sufficiently to render the film loop taut, and then backed off a predetermined distance. On machines of identical design the correct position of wall 75 (or of roller 70) is unique, so that no adjustability is theoretically necessary. However, in practice such adjustment may permit greater tolerances in manufacture, and is particularly desirable when an existing machine is to be provided with a loop replenishing device in accordance with the invention.

Operation of the modification of Fig. 3 is substantially as already described for that of Figs. 1 and 2, except that when the film is drawn by sprocket 58 taut over wall 75, the fixed mounting of the wall causes the film to slide over wall face 76. That sliding movement may be facilitated by providing the wall with a polished metal contact face 76, and damage to the film is readily avoided by relieving that surface where it might otherwise contact the picture or sound track areas of the film. An advantage of the present modification is that the form of wall contact face 76 need not be strictly cylindrical, but may conform to the natural shape of film loop 38 in its contracted position. That facilitates location of the wall face in position to provide minimum film contact during normal operation of the machine, while providing the desired small value of loop slack at the start of each stroke.

A further feature of the invention is that it facilitates correct threading of the machine. Particularly when the film carries a sound track and passes from sprocket 58 to a sound pickup device, it is desirable that lower film loop 38 have a definite average size. In machines embodying the invention that condition can be insured in threading the film merely by pulling loop 38 substantially taut over the loop limiting wall to sprocket 58. When the machine is started, film loop 38 then assumes the precise size appropriate to the wall position.

I claim:
1. In a kinetograph machine of the type that includes an intermittent mechanism for intermittently engaging and advancing a perforated film through a film gate and that includes a continuously rotating sprocket for receiving film from the intermittent mechanism through a normally freely hanging slack film loop that normally assumes a definite contracted position at the start of the film moving stroke of the intermittent mechanism; a substantially cylindrical loop limiting surface having a radius of curvature substantially equal to the radius of curvature of the central portion of the freely hanging film loop in its contracted position, the said surface being rigidly supported in substantial coincidence with the inner face of the film loop in contracted position thereof, and the said surface being so positioned that when the film loop is drawn taut over it a film perforation will be so positioned in the film gate that the intermittent mechanism will engage the perforation at the beginning of the film moving stroke.

2. In a kinetograph machine having an intermittent mechanism for intermittently engaging and advancing a perforated film through a film gate and having a continuously rotating sprocket for receiving film from the intermittent mechanism through a slack film loop that normally assumes a definite contracted position at the start of the film moving stroke of the intermittent mechanism; a cylindrical roller freely rotatably mounted within the film loop with the cylindrical surface of the roller substantially coinciding with the inner face of the film loop over a substantial fraction of the curved portion of its length in its said contracted position, the roller being so positioned that when the film loop is drawn taut over the roller a film perforation will be so positioned in the film gate that the intermittent mechanism will engage the perforation at the beginning of its film moving stroke.

3. In a kinetograph mechanism for intermittently moving a film having film perforations that have a definite longitudinal dimension and are spaced longitudinally of the film by uniform perforation intervals, the said mechanism being of the type that includes a mechanism frame, a film guide mounted on the frame and having a delivery end from which film is delivered in a predetermined delivery direction, an intermittent mechanism including a claw that is operable in a periodic cycle to normally intermittently engage a perforation of a film in the film guide and to advance the film toward the delivery end of the film guide in a stroke of predetermined length equal to an integral number of perforation intervals, and means for driving the intermittent mechanism at a predetermined cyclic speed; supplementary film advancing means, comprising a film takeup sprocket adapted to engage film perforations and journaled on the frame in position to receive film from the film guide in a predetermined takeup direction different from the said delivery direction, whereby film passing from the film guide to the sprocket forms a slack film loop, a driving connection between the intermittent mechanism and the sprocket acting to drive the sprocket in definite phase relation to the cycle of the intermittent mechanism and at such relative speed that the length of film taken up by the sprocket during each cycle of the intermittent mechanism is equal to the said stroke length, whereby the film loop normally varies periodically between a definite contracted position at the start of each film advancing stroke and a definite expanded position at the finish of each film advancing stroke, and a loop limiting member supported on the frame within the film loop and over which the film loop may be drawn taut, the overall length of the film loop when drawn taut over the loop limiting member being less than the overall length of the film loop in normally contracted position by a distance less than the longitudinal dimension of a film perforation, the loop limiting member being so positioned that when the film loop is drawn taut over the loop limiting surface a film perforation will be so positioned in the film guide that the claw will engage the perforation at the beginning of its film advancing stroke.

4. Supplementary film advancing means as defined in claim 3 and in which the said loop limiting member comprises a cylindrical roller that is journaled on an axis fixed relative to the frame in such position that the cylindrical roller surface is substantially tangent to the delivery direction of the film guide and to the takeup direction of the sprocket.

5. In a kinetograph mechanism for intermittently moving a film having film perforations that have a definite longitudinal dimension and are spaced longitudinally of the film by uniform perforation intervals, the said mechanism being of the type that includes a mechanism frame, a film guide mounted on the frame and having a delivery end, an intermittent mechanism including a claw that is operable in a periodic cycle to normally intermittently engage a perforation of a film in the film guide and to advance the film toward the delivery end of the film guide in a stroke of predetermined length equal to an integral number of perforation intervals, and a film takeup sprocket receiving film from the film guide through a slack loop which normally varies periodically between a definite contracted position and a definite expanded position; a loop limiting device comprising a member mounted on the frame within the curve of the film loop, said member having a rigidly supported convex loop limiting surface that substantially coincides with the inner concave surface of the film loop over a substantial fraction of the curve of the loop in its said contracted position, the remaining longitudinal slack in the normally contracted film loop around said convex surface being less than the longitudinal dimension of a film perforation, and the said surface being so positioned that when the film loop is drawn taut over it a film perforation will be so positioned in the film guide that the intermittent mechanism will engage the perforation at the beginning of the film moving stroke.

6. A loop limiting device as defined in claim 5 and in which the said loop limiting member comprises a cylindrical roller that is journaled on an axis fixed relative to the frame in such position that the cylindrical roller surface is substantially tangent to the delivery direction of the film guide and to the takeup direction of the sprocket.

7. In a kinetograph machine of the type that includes an intermittent mechanism for intermittently engaging and advancing a perforated film through a film gate and that includes a continuously rotating sprocket for receiving film from the intermittent mechanism through a normally slack film loop; the improvement that comprises a loop limiting member mounted within the film loop, said member having a rigidly supported convex surface over which the film loop is normally slack, the loop limiting member being so positioned with respect to the intermittent mechanism and the sprocket that when the film loop is drawn taut over the said convex surface a film perforation will be so positioned in the film gate that the intermittent mechanism will engage the perforation at the beginning of its film advancing stroke.

MURRAY E. PARSONS.

References Cited in the file of this patent

UNITED STATES PATENTS

| Number | Name | Date |
| --- | --- | --- |
| 2,036,378 | Wittel | Apr. 7, 1936 |